United States Patent [19]

Shiota et al.

[11] Patent Number: 4,924,302

[45] Date of Patent: May 8, 1990

[54] CRT COLOR VIDEO PRINTER WHICH ELIMINATES MAGNIFICATION CHANGES DUE TO CHROMATIC ABERRATIONS

[75] Inventors: Kazuo Shiota; Kiichiro Sakamoto, both of Kanagawa, Japan

[73] Assignee: Fuji Photo Film Co., Ltd., Kanagawa, Japan

[21] Appl. No.: 246,114

[22] Filed: Sep. 19, 1988

[30] Foreign Application Priority Data

Sep. 18, 1987 [JP] Japan ............................. 62-233797
Sep. 18, 1987 [JP] Japan ............................. 62-233798

[51] Int. Cl.⁵ ..................... H04N 1/46; H04N 5/84; H04N 9/79
[52] U.S. Cl. ................................. 358/75; 358/244; 358/332
[58] Field of Search ............... 358/75, 78, 244, 244.1, 358/244.2, 310 (U.S. only), 332

[56] References Cited

U.S. PATENT DOCUMENTS

| | | | |
|---|---|---|---|
| 4,468,693 | 8/1984 | Fujita et al. | 358/75 |
| 4,673,972 | 6/1987 | Yokomizo | 358/77 |
| 4,763,189 | 8/1988 | Komatsu et al. | 358/75 |

FOREIGN PATENT DOCUMENTS

| | | | |
|---|---|---|---|
| 53-33141 | 3/1978 | Japan | 358/75 |
| 57-170666 | 10/1982 | Japan | 358/75 |
| 58-31330 | 2/1983 | Japan | . |
| 60-135918 | 7/1985 | Japan | 358/75 |
| 60-176389 | 9/1985 | Japan | 358/244 |
| 62-66246 | 3/1987 | Japan | . |

Primary Examiner—James J. Groody
Assistant Examiner—Randall S. Svihla
Attorney, Agent, or Firm—Sughrue, Mion, Zinn, Macpeak & Seas

[57] ABSTRACT

An apparatus for making a color print has a black-and-white CRT for frame-sequentially displaying black-and-white images of three monochromatic images of an image in the form of a brightness pattern thereon, color filters for sequentially changing the black-and-white images to corresponding monochromatic images, a printing lens for projecting each monochromatic image onto a photographic material, and means for changing image size by color through which each monochromatic image is projected on the photographic material by the printing lens, so as to make the three monochromatic images projected onto the photographic material the same size. In the case of the printing lens having a fixed focal length, the image size changing means comprises an amplifier for amplifying vertical and horizontal deflection signals for driving the CRT and means for changing a gain of the amplifier for every exposure of each monochromatic image, so as to make the three monochromatic images projected onto the photographic material the same size. On the other hand, in the case of the printing lens being variable in focal length, the image size changing means comprises memory means for storing magnifications by color for several specific focal lengths of the zoom printing lens and means for adjusting the focal length of the zoom printing lens according to the magnifications stored in the memory means, so as to make the three monochromatic images projected onto the photographic material the same size.

5 Claims, 5 Drawing Sheets

CRT COLOR VIDEO PRINTER WHICH ELIMINATES MAGNIFICATION CHANGES DUE TO CHROMATIC ABERRATIONS

BACKGROUND OF THE INVENTION

The present invention relates to a CRT color video printer for printing a video image displayed on a black-and-white CRT on a photographic material in a three color sequential exposure by the use of a printing lens, and more particularly to a CRT color video printer for printing a video image displayed on a black-and-white CRT onto a photographic material by the use of a zoom lens in which chromatic aberrations in magnification of the printing lens can be corrected.

CRT color video printers use black-and-white CRTs to sequentially display black-and-white images in a brightness pattern corresponding to three color images which in turn are changed to three monochromatic images through three color filters. The use of black-and-white CRTs is useful for improving resolution. The three monochromatic images are printed on a photographic material such as a color photographic paper in a three color sequential exposure. Such a CRT color video printer is disclosed in, for example, Japanese Patent Unexamined Publication No. 58-31330.

In such CRT color video printers, as is disclosed in, for example, Japanese Patent Unexamined Publication No. 62-66246, it increasingly becomes popular to use a zoom lens having a relatively high zooming ratio as a printing lens in order to make various sizes of prints.

With a printing lens having a high magnification or a zoom lens available at a high magnification, a hard copy or print sometimes shows blurred colors and color registration errors. These color defects are caused due to lateral and longitudinal chromatic aberrations which are different depending upon colors and magnifications of the printing lens. In the extreme case, a deviation of approximately two percent of the overall height of an image arises between, for example, red and blue images. For example, the peripheral deviation may be approximately 2 mm for an image having an overall height of about 100 mm. Such deviations lead to hard copies of inferior image quality.

The changes of magnification due to chromatic aberrations can be eliminated or reduced by using several lenses in combination. But the provision of a plurality of lenses is very expensive and therefore increases the manufacturing cost of the CRT color video printer.

OBJECT OF THE INVENTION

It is, therefore, an object of the present invention to provide a CRT video printer which can eliminate the change in magnification due to chromatic aberrations.

SUMMARY OF THE INVENTION

For achieving the above object, the present invention provides a CRT color video printer, comprising: a black-and-white CRT for sequentially displaying black-and-white images of three monochromatic images of an image in the form of a brightness pattern thereon; color filters for sequentially changing the black-and-white images to corresponding monochromatic images; a printing lens for projecting each monochromatic image onto a photographic material and means for changing image size by color in which each monochromatic image is projected on the photographic material, such that the three monochromatic images projected onto the photographic material are the same size.

According to a preferred embodiment of the present invention, the image size changing means comprises an amplifier for amplifying vertical and horizontal deflection signals for driving the CRT; and means for changing a gain of the amplifier for every exposure of each monochromatic image, so as to make the three monochromatic images projected onto the photographic material the same size.

According to another preferred embodiment of the present invention, the CRT color video printer is provided with a zoom printing lens wherein the image size changing means comprises memory means for storing magnifications by color for several specific focal lengths of the zoom printing lens; and means for adjusting the focal length of the zoom printing lens according to the magnifications stored in the memory means, such that the three monochromatic images projected onto the photographic material are the same size.

BRIEF DESCRIPTION OF THE DRAWINGS

The description refers to the accompanying drawings in which.

DETAILED DESCRIPTION OF THE INVENTION

Figure 1:
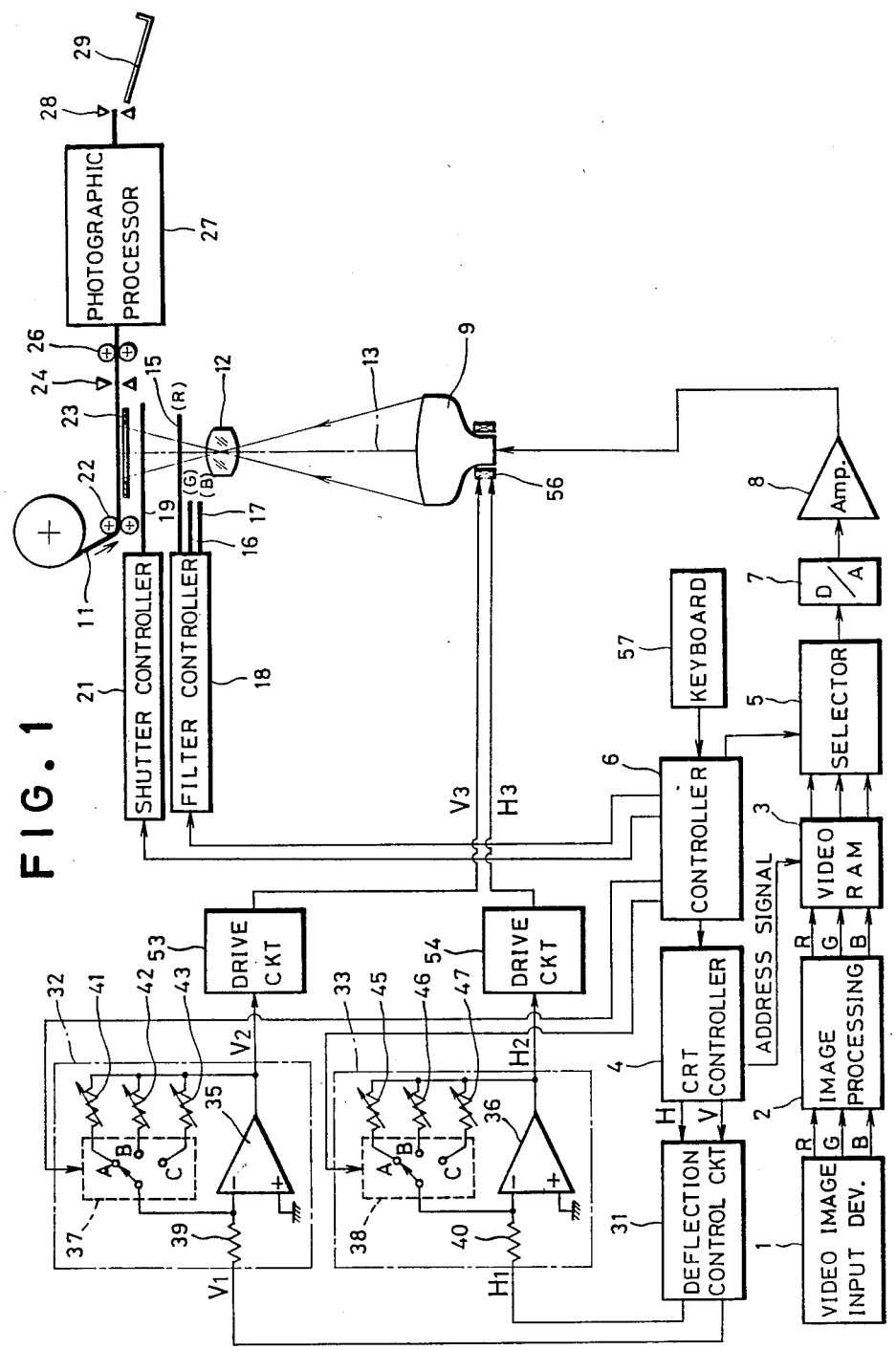
FIG. 1 is a block diagram showing the CRT color video printer according to a preferred embodiment of the present invention.

Referring now to FIG. 1, shown therein is the CRT color video printer according to a preferred embodiment of the present invention. As shown, the CRT color video printer includes a video image input device 1 for reproducing an image of color video signals recorded on a video tap or a video floppy or entering color video signals provided by a color TV camera into the CRT color video printer. The video image input device 1 separates the color video signals into three color video signals red, green and blue and converts the three color video signals from an analog form to a digital form. The digital video signals of a negative image of a single film frame are subjected to various image processing such as color correction, gradation correction and/or positive-to-negative image conversion, in an image processing section 2. The three color digital video signals of the frame of the negative image are then sent to and written in a video RAM 3. If a reversal color photographic paper is used, the analog video signals for three colors are written in the video RAM 3 without being converted into positive video signals.

A CRT controller 4 comprises a clock generator and a plurality of counters. The CRT controller 4 generates address signals to be sent to the video RAM 3 and vertical and horizontal synchronizing signals V and H to be sent to a deflection control circuit 31. Data of the three color video signals read out from the video RAM 3 upon printing are sent to a selector 5 which is controlled by a controller 6 so as to selectively transmit the three color video signals to a D/A converter 7. The D/A converter 7 converts the analog video signals sent thereto into an analog form and sends them to an amplifier 8 for amplification. After amplification, the analog video signals selected by color of the selector 5 are displayed as a black-and-white image in the form of a brightness pattern on a black-and-white CRT 9. In this manner, three black-and-white negative images for red, green and blue are displayed in sequence.

Above the black-and-white CRT 9, there is a photographic material such as a color photographic paper 11 onto which the black-and-white video images displayed on the black-and-white CRT are printed by a printing lens 12 in multiple exposure. In a printing path 13 defined by the printing lens 12, there are three color filters 15, 16 and 17, namely a red filter (R), a green filter (G) and a blue filter (B). A filter controller 18 inserts the three color filters 15 and 17 into the printing path 13 independently of the other two but in sequence for additive printing in three color frame sequence exposure. Between the printing lens 12 and the color photographic paper 11, there is disposed a shutter 19 controlled by a shutter controller 21 to open and close once every color, namely three times for one frame.

The color photographic paper 11, in the form of a roll, is withdrawn by a pair of withdrawing rollers 22 frame by frame and placed in an exposure position defined by a framing mask 23. The color photographic paper 11, after the exposure of a predetermined number of frames, is cut by a cutter 24 to form a strip which in turn is transported into a photographic processor 27 by means of a pair of transporting rollers 26. In the photographic processor 27, the strip of exposed color photographic paper 11 is processed in a well known manner and then cut in to individual prints by a cutter 28. The prints are delivered into a tray 29.

Vertical and horizontal synchronizing signals V and H provided by the CRT controller 4 are sent to the deflection control circuit 31 for providing vertical and horizontal deflecting signals $V_1$ and $H_1$ in the form of a sawtooth wave. These deflecting signals $V_1$ and $H_1$ are sent to first and second amplifier circuits 32 and 33, respectively. The first amplifier circuitry 32 comprises an operational amplifier 35, a resistor 39 connected to an inverse input terminal of the operational amplifier 35, three variable resistors 41, 42 and 43 connected in parallel with one another, and a changeover switch 37 for selectively connecting the variable resistors 41 to 43 with a feed-back circuit of the operational amplifier 35. The changeover switch 37 selects a contact "a" for the exposure of a red image, a contact "b" for the exposure of a red image, a contact "c" for the exposure of a blue image so as to vary a feedback resistance in order to change the gain of the operation amplifier 35 by color. The second amplifier circuitry 33 comprises the same constructional elements as those of the first amplifier circuitry 32, namely an operational amplifier 36, a resistor 40, three variable resistors 45 to 47, and a changeover switch 38. Operation of the amplifier circuit 33 is also the same in operation and a detailed description is not needed.

Vertical and horizontal deflecting signals $V_2$ and $H_2$ provided by the first and second amplifier circuits 32 and 33 are sent to drive circuits 53 and 54, respectively. These drive circuits 53 and 54 increase the levels of deflecting signals $V_2$ and $H_2$ to levels of deflection having sufficient power to drive the black-and-white CRT 9 and send them to a deflection yoke 56 of the black-and-white CRT 9. The deflection yoke 56 deflects an electron beam up and down according to the vertical synchronizing signals $V_3$ provided from the drive circuit 53 and right and left according to the horizontal synchronizing signals $H_3$ from the drive circuit 54 so as to scan a phosphor screen of the black-and-white CRT 9. By changing the gain of the operational amplifier 35 and 36 through the changeover switches 37 and 38, the deflection of electron beam can be varied. In order to vary the deflection of electron beam, the variable resistors 41 to 43 and 45 to 47 are used. Because chromatic aberrations for colors are different depending upon magnifications and printing lenses, it is preferred to adjust the resistance of the variable resistors according to magnifications of a printing lens and/or printing lenses. The adjustment of resistance may be performed in the following manner.

Figure 4:
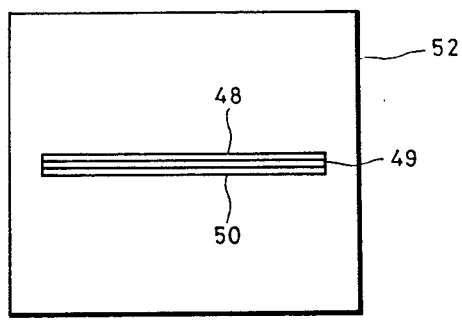
FIG. 4 is a plan view of a test chart.

For adjusting the resistance, a test chart 52 such as shown in FIG. 4 is prepared. The test chart 52 has a pattern comprising red, green and blue stripes 48, 49 and 50, each having the same length and width. An image of this test chart 52 is taken by, for example, a color TV camera and displayed on the black-and-white CRT 9. In the same way as described above, a color print of the test chart 52 is made. By visually observing the color print, based on resistances of the variable resistors 42 and 46 for a green image of the color print of the test chart 52, resistances of the variable resistors 41, 43, 45 and 47 for red and blue images are adjusted according to image sizes of the red and blue images relative to the green image of the print. Thereafter, another print of the test chart 52 is made. If there are differences in length between three stripe images of the print, the variable resistors 41 to 43 and 45 to 47 are regulated again. This adjustment of the variable resistors is repeated until the three color stripe images of a print become equal to one another.

Figure 2:
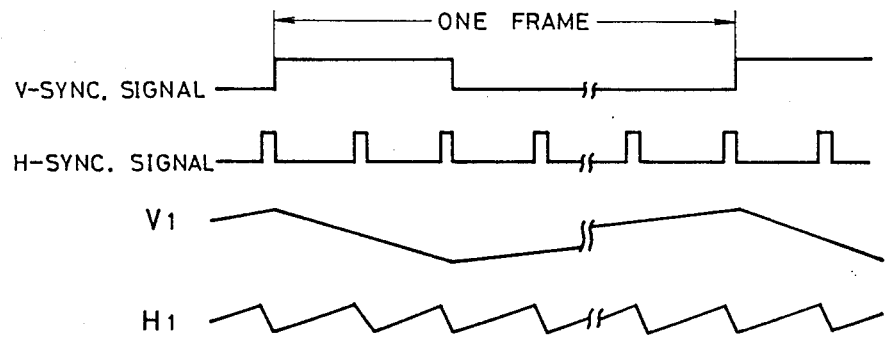
FIG. 2 are graphs showing the wave forms of various signals.
Figure 3:
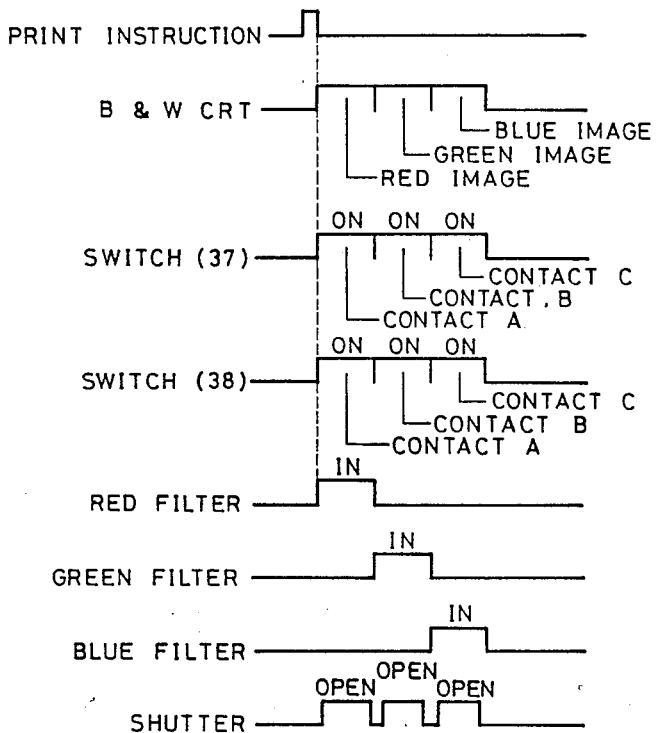
FIG. 3 is a time chart showing a sequential operation of various elements of the CRT color video printer of FIG. 1.

The operation of the CRT color video printer thus constructed will be described with reference to FIG. 3. Instructions for printing a video image are entered into the controller 6 through a keyboard 57. The controller 6 causes the changeover switches 37 and 38 to select respective contacts "a", and the CRT controller 4 to send vertical and horizontal synchronizing signals V and H to the deflection control circuit 31. The deflection circuit 31, as is shown in FIG. 2, provides and send vertical and horizontal synchronizing signals $V_1$ and $H_1$, respectively, to the first and second amplifier circuits 32 and 33.

The variable resistor 41 is selected through the contact "a" and connected to the feed-back circuit in the first amplifier circuitry 32. As a result, a ratio of resistance of the variable resistor 41 for red relative to the resistance of the resistor 39 is set so as to fix the gain of the operational amplifier 35 according to which the vertical snychronizing signal $V_1$ is amplified. In a same manner, in the second amplifier circuitry 33, the horizontal synchronizing signal $H_1$ is amplified according to the gain of the operational amplifier 36 fixed based on a ratio of resistance of the variable resistor 45 for red relative to the resistance of the resistor 40. The vertical and horizontal synchronizing signals $V_2$ and $H_2$ thus amplified and outputted from the amplifier circuits 32 and 33 are increased to a signal level of synchronizing power sufficient to cause the drive circuits 53 and 54 to drive the deflection yoke 56 of the black-and-white CRT 9.

On the other hand, in the video RAM 3, three color video signals of a negative image, which are provided by means of the video image input device 1 and processed in the image processor 2, are stored by color. As was previously described, when an instruction for printing a video image is entered, the CRT 4 reads out red, green and blue video signals of each picture element for one frame in sequence from the video RAM 3 and sends them to the selector 5. The selector 5 selects and transmits the red video signals first to the D/A converter 7 for digital-to-analog conversion. The red analog video signals are amplified to an appropriate signal level by the amplifier 8 and then sent to the black-and-white CRT 9 to be displayed thereon as a black-and-white image in the form of a brightness pattern of the red image. Because the first and second amplifiers 32 and 33 select the variable resistors 41 and 45, respectively, and the deflection yoke 56 vertically and horizontally deflects the electron beam according to the ratios of the resistances of the variable resistors 41 and 45 for red relative to the resistance of the resistor 39 and 40, respectively, so as to scan the phosphor screen of the black-and-white CRT 9, a black-and-white image displayed on the black-and-white CRT 9 is sized according to a magnification of the printing lens 12 for red. While the black-and-white CRT 9 is being excited, the red filter 15 is inserted into the printing path 13 to change the black-and-white image to a red image. Then, the shutter 19 is opened for an exposure time which is determined based on the light sensitivity of the color photographic paper 11 to red so as to project the red image onto the color photographic paper 11 through the printing lens 12, thereby forming a latent image in the photographic paper 11.

After the exposure of red image, the shutter 19 is closed, allowing the replacement of the red filter 15 with the green filter 16 in the printing path 13. In cooperation with the replacement of the red filter 15 with the green filter 16, the changeover switches 37 and 38 select the contacts "b", respectively. As a result, the deflection yoke 56 deflects the electron beam vertically and horizontally according to the gains of the first and second amplifiers 32 and 33 determined depending upon the ratios of the resistances of the variable resistors 42 and 46 for green relative to the resistances of the resistors 39 and 40, respectively, so that black-and-white images for green is displayed as large as the black-and-white image for red on the black-and-white CRT 9. Immediately thereafter, the shutter is opened again to project a green image onto the color photographic paper 11 through the printing lens 12, thereby forming a green latent image over the red latent image in the color photographic paper 11.

In the same way as for the red and green images, the green filter 16 is replaced with the blue filter 17 and the changeover switches 37 and 38 select the contacts "c" so as to display a black-and-white image in the form of a brightness pattern of the blue image on the black-and-white CRT 9. Thereafter, the shutter 19 is opened again to form a blue latent image over the read and green images in the color photographic paper 11.

As apparent from the above description, because the gain of each of the first and second amplifier circuits 32 and 33 is changed in cooperation with the replacement of the color filters, the raster is changed in size by color so as to form a same size of three color latent images on the color photographic paper 11, resulting in a print with a color image without any color registration. That is, printed images by the CRT color printer are independent from lateral chromatic aberrations of the printing lens 12.

Printing instruction is given through the keyboard 57 to make exposure frame by frame so as to make prints. When a predetermined number of exposures of a predetermined number of frames are made, the cutter 24 is actuated to cut the exposed part of the color photographic paper 11 in the form of a strip and transports the strip of the color photographic paper 11 to the photographic processor 27. After processing, the strip is cut into individual prints by the cutter 20 which are delivered to the tray 29.

In this embodiment, it is permissible to use a zoom printing lens in place of the printing lens 12. In this case, the variable registers may be either manually or automatically adjusted according to magnifications or focal lengths of the zoom printing lens so as to cancel the changes of magnifications of printing lens due to chromatic aberrations.

Figure 5:
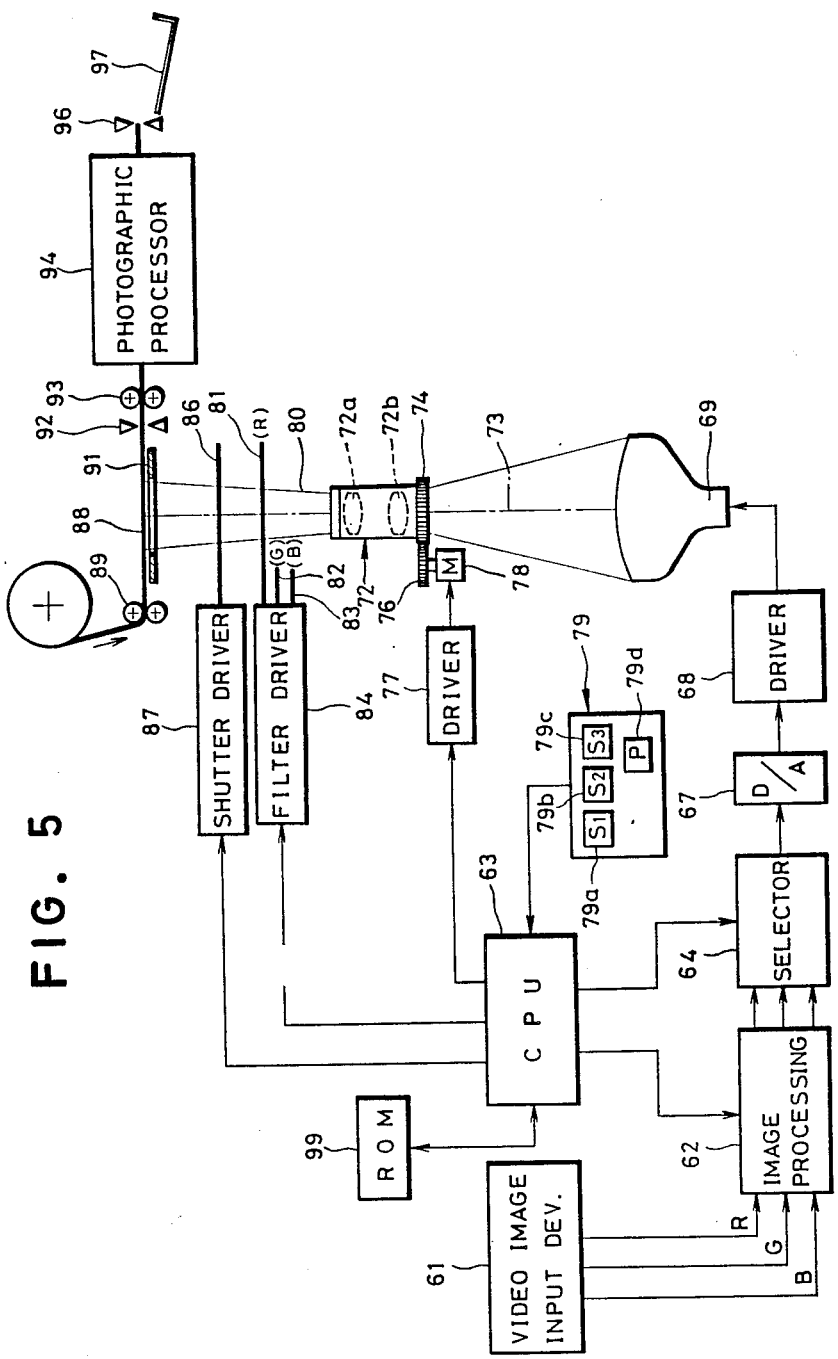
FIG. 5 is a block diagram showing the CRT color video printer according to another preferred embodiment of the present invention.

Referring to FIG. 5, shown therein is the CRT color video printer according to another preferred embodiment of the present invention. As shown, the CRT color video printer includes a video image input device 61 and an image processing section 62 which are the same in construction and operation as those of the previous embodiment of the CRT color video printer and, therefore, no description is needed. The video image input device 1 separates the color video signals into three color video signals for red, green and blue and converts the three color video signals form an analog form to a digital form. The digital video signals for one frame are subjected to various image processing such as color correction, gradation correction and/or positive-to-negative image conversion, in a image processing section 62. The three color digital video signals for a negative image of one film frame are then sent to and stored in a memory (not shown) provided in the image processing section 2. When using a reversal color photographic paper, the three color analog video signals of a positive image are stored in memory provided in the image processing section 62 without being subjected to positive to negative conversion.

The video signals for one film frame in the memory are read out by a read out instruction from a central processing unit (CPU) 63 upon printing. The three color video signals thus read out are sent to a selector 64 which is controlled by the CPU 63 so as to selectively transmit the video signals of one color to a D/A converter 67. The D/A converter 67 converts the video signals in a digital form sent thereto into the form of analog video signals and sends them to a driver 68 for amplification. After amplification, the analog video signals selected by the selector 64 are displayed as a black-and-white image in the form of a brightness pattern on a black-and-white CRT 69. In this way, three black-and-white negative images for red, green and blue are displayed in sequence.

Above the black-and-white CRT 69, there is a photographic material such as a color photographic paper 88 onto which the black-and-white video images on the black-and-white CRT 69 are printed by a printing zoom lens 72 in multiple exposure. This printing zoom lens 72 comprises a variater lens 72a and a compensator lens 72b which are adjusted along the optical axis 73 to vary the focal length of the printing zoom lens 72. For varying the focal length of the printing zoom lens 72, the variater and compensator lenses 72a and 72b are incorporated with a shift mechanism including a gear 74 in mesh with a gear 76 coupled to an output shaft of a pulse motor 78. The shift mechanism may be of any type well known in the art. This pulse motor 78 is controlled in rotational direction by the amount of rotation of a motor driver 77. In this embodiment, a plurality of print sizes are provided, for example large, medium and small print sizes S1, S2 and S3. Any desirable print size can be selected by varying the focal length of the printing zoom lens 72. For varying the focal length of the printing zoom lens 72, there is provided a print size selection keys 79a, 79b or 79c which are selectively operated to shift the variater and compensator lenses 72a and 72b.

In a printing path 73 defined by the printing zoom lens 12, there are three color filters 81, 82 and 83, namely a red filter (R), a green filter (G) and a blue filter (B). A filter driver 84 inserts the three color filters 81 to 83 into the printing path 13 independently of the other two but in sequence for additive printing in three color frame sequence exposure. Between the printing lens 72 and the color photographic paper 88, there is disposed shutter means 86 controlled by a shutter driver 87 to open and close once every color exposure, that is, three times in total for an image of one film frame.

The color photographic paper 88, in the form of a roll, is withdrawn by a pair of withdrawing rollers 89 frame by frame and placed in an exposure position defined by a framing mask 91. The color photographic paper 88, after the exposures of a predetermined number of frames, is cut by a cutter 92 into a paper strip which in turn is transported into a photographic processor 94 by means of a pair of transporting rollers 93. In the photographic processor 94, the paper strip of exposed color photographic paper 88 is processed in a well-known manner and then cut off to individual prints by a cutter 96. The prints are delivered into a tray 97.

Figure 6:
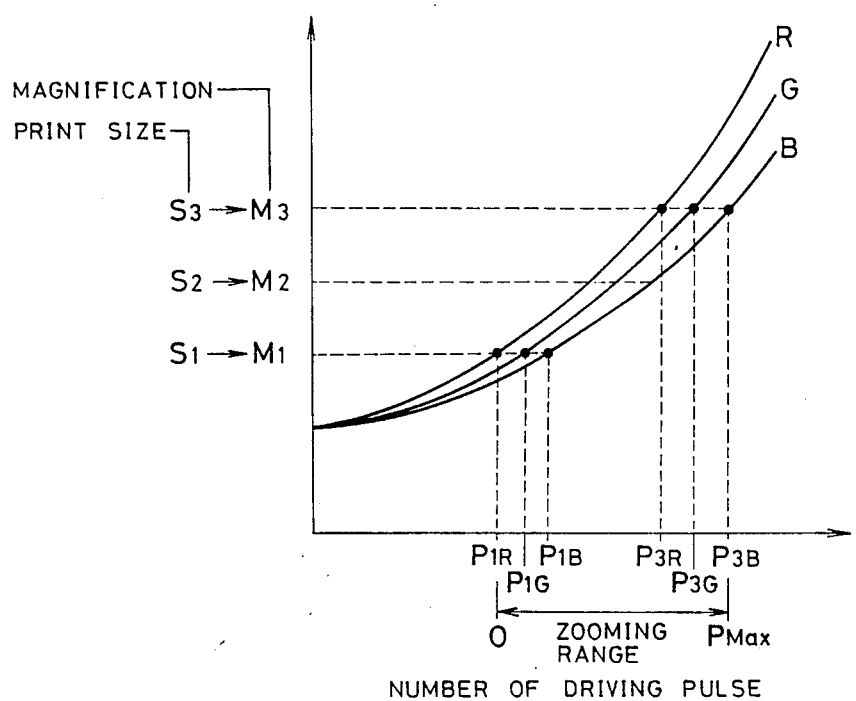
FIG. 6 is a graph of magnifications of a zoom printing lens relative to lens positions.
Figure 7:
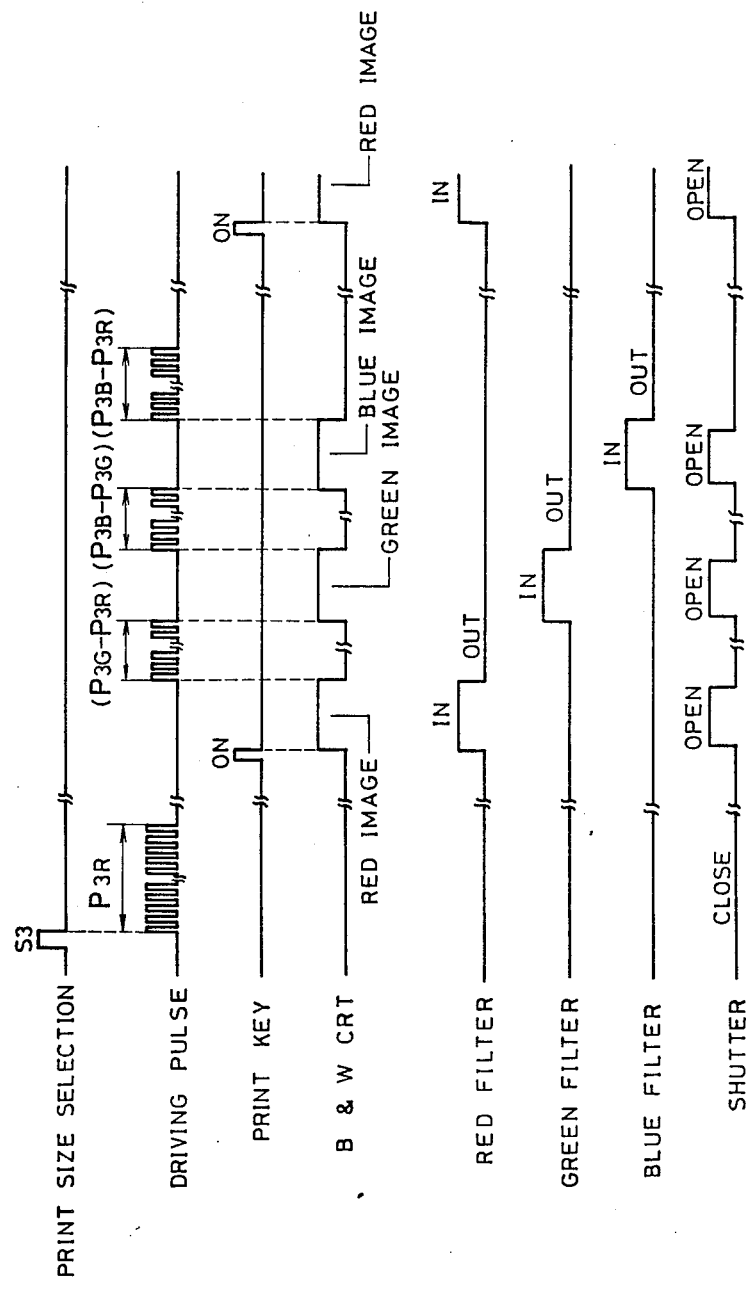
FIG. 7 is a time chart showing a sequential operation of various elements of the CRT color video printer of FIG. 5.

Stored in a ROM 99 is a table data including, for example, nine points on magnification curves showing the relation between magnifications and the number of drive pulses to be applied to the pulse motor 78, as is shown in FIG. 6. The particular number of drive pulses correspond to the lens positions, namely the focal lengths of the zoom printing lens 72 and the magnifications M1–M3 correspond to particular print sizes S1-S3, respectively. Because the magnification of the zoom printing lens 72 depends upon the wavelength of light, the magnification curves are experimentally provides, one for each color. The table data is specified when designing the CRT color video printer and stored in the ROM when manufacturing thereof. The operation of the CRT color video printer thus constructed will be described with reference to FIG. 7, which is a time chart illustrating sequential operation timings of various elements of the CRT color video printer. In the memory of the image processing section 62, video signals of a negative image separated by color, which are inputted through the video image input device 61 and processed by the image processing section 62, are stored. A desired printing size, for example the largest printing size S3, is selected by the print size selection key 79c. As a result of the operation of the print size key 79c, the CPU 63 retrieves drives pulse data with reference to the table data in the ROM 99 to determine the number of drive pulses $R_{3R}$ necessary to vary the focal length of the zoom printing lens 72 so as to provide the magnification M3 for red. At this time, since the variater lens 72a and the compensator lens 72b are at positions where no drive pulse is applied to the pulse motor 78, the CPU 63 sends the driver 77 drive pulses of the number $P_{3R}$ to drive the pulse motor 78 in the normal direction of rotation, so as to thereby adjust the focal length of th zoom printing lens 72.

An instruction for printing a video image is entered through a keyboard 57. The CPU 63 causes the filter driver 84 to insert the red filter 81 first into the printing path of the zoom printing lens 72 and, simultaneously, reads out red, green and blue video signals of each picture element for one frame in sequence from the memory of the image processing section 62 and sends them to the selector 64. The selector 64 selects and transmits the red video signals first to the D/A converter 67 for digital-to-analog conversion. The red analog video signals are amplified to an appropriate signal level and then sent to the black-and-white CRT 69 through the driver 68 to be displayed thereon as a black-and-white image in the form of a brightness pattern of the red image. While the black-and-white CRT 9 display the black-and-white image for the red image, the red filter 81 is positioned in the printing path 73 to change the black-and-white image to a red image. Then, the shutter 86 is opened for an exposure time which is determined based on the light sensitivity of the color photographic paper 88 to red so as to project the red image onto the color photographic paper 88 through the printing lens 72, thereby forming a latent image in the photographic paper 88.

After the exposure of red image, the shutter 86 is closed for allowing the replacement of the red filter 81 with the green filter 82 in the printing path 13. On the other hand, the CPU 62 reads out the number of pulses $P_{3G}$ necessary to give the magnification of M3 for green with reference to the table data in the ROM 99 and sends drive pulses of the number equal to the difference between the numbers of drive pulses $P_{3R}$ and $P_{3G}$ to the driver 77 to drive the pulse motor 78 in the normal direction of rotation, so as to thereby adjust the focal length of the zoom printing lens 72 to give the magnification M3 for green. In cooperation with the replacement of the red filter 81 with the green filter 82, the black-and-white CRT 69 displays a black-and-white image for green thereon. Immediately thereafter, the shutter 86 is opened again to project a green image onto the color photographic paper 88 through the printing lens 12, thereby forming a green latent image over the red latent image in a same image size S3 in the color photographic paper 88.

In the same way as for the red and green images, the green filter 82 is replaced with the blue filter 83 and the black-and-white CRT 69 displays a black-and-white image in the form of a brightness pattern of the blue image thereon. Thereafter, the shutter 86 is opened again to form a blue latent image over the red and green images in a same image size on the color photographic paper 88.

When a print is effected in three color frame sequence exposure, the CPU 63 sends the number of pulses equivalent to the difference of the numbers of pulses $P_{3B}$ and $P_{3R}$ to the driver 77 to drive the pulse motor 78 so as to return the variater lens 72a and the compensator lens 72b to their initial positions. Thus, the CRT color video printer is ready for another print.

When the print size S1 is desired, the key 79a of the keyboard 79 is pushed. The CPU 63 sends the number of drive pulses equivalent to the difference between the numbers of drive pulses $P_{3R}$ and $P_{1R}$ and information on the direction of rotation to the driver 77 so as to drive the pulse motor in order to vary the focal length of the zoom printing lens 72 to give the magnification M1 suitable for the print size S1. Thereafter, a same sequential printing operation takes place.

Printing instruction is given through the keyboard 79 to make an exposure one frame after another frame. When exposures of a predetermined number of frames are made, the cutter 92 is actuated to cut the exposed part of the color photographic paper 88 into strip and the rollers 93 transport the strip of the color photographic paper 88 to the photographic processor 94. After processing, the strip is cut into individual prints by the cutter 96 and the individual prints are delivered into the tray 97.

In this embodiment, although the table data shown in FIG. 6 is specified upon the designing of the CRT color video printer and stored in the ROM 99 when manufacturing thereof, it is preferred, in the case of using zoom printing lenses having a wide variable range of focal length, to store table data individual to each zoom printing lens in an EPROM or the like because chromatic aberrations are different due to higher zooming ratios.

Any of the above described embodiments may be applied to CRT color video printers of the type using, in place of the red, green and blue filters, cyan, magenta and yellow filters which are inserted into the printing path by every two filters one over the other.

The present invention has been shown and described with reference to specific embodiments. However, it should be noted that the invention is in no way limited to the details of the illustrated embodiments, and changes and modifications may be made without departing from the scope of the appended claims.

What is claimed is:

1. A printer for making a color print, which comprises:
   a black-and-white CRT for sequentially displaying black-and-white images of three monochromatic images of an image in the form of a brightness pattern thereon;
   color filters for sequentially changing said black-and-white images to corresponding monochromatic images;
   a printing lens for projecting each monochromatic image onto a photographic material;
   an amplifier for amplifying vertical and horizontal deflection signals for driving said CRT; and
   means for changing a gain of said amplifier for every exposure of each monochromatic image, so as to make said three monochromatic images projected onto said photographic material the same size.

2. An apparatus as defined in claim 1, wherein said changing means is actuated to change said gain in cooperation with said three color filters.

3. An apparatus as defined in claim 1 or 2, wherein said amplifier is an operational amplifier and said changing means comprises three parallel variable resistors and a switch for selectively connecting said variable resistors to a feed-back circuit of said amplifier.

4. An apparatus for making a color print, which comprises:
   a black-and-white CRT for sequentially displaying black-and-white images of three monochromatic images of an image in the form of a brightness pattern thereon;
   color filters for sequentially changing said black-and-white images to corresponding monochromatic images;
   a zoom printing lens for projecting each monochromatic image onto a photographic material;
   memory means for memorizing focal lengths by color for several specific magnifications of said zoom printing lens;
   and means for adjusting the focal length of said zoom printing lens according to said focal lengths memorized in said memory means on the basis of a selected specific magnification, so as to make said three monochromatic images projected onto said photographic material the same size.

5. An apparatus as defined in claim 4, wherein said focal lengths of said zoom printing lens are memorized in the form of a number of drive pulses which are applied to a pulse motor to adjust an optical system of said zoom printing lens.

* * * * *